Patented Oct. 11, 1949

2,484,501

UNITED STATES PATENT OFFICE

2,484,501

COPOLYMERS OF ENOL ESTERS OF DIKETONES

Hugh J. Hagemeyer, Jr., Kingsport, Tenn., assignor to Eastman Kodak Company, Rochester, N. Y., a corporation of New Jersey No Drawing. Application November 26, 1947, Serial No. 788,321

16 Claims. (Cl. 260—66)

This invention relates to the preparation of copolymers of acylated enolates of diketones. More specifically this invention relates to a process for preparing new copolymers which comprises copolymerizing an organic polymerizable, unsaturated compound and an acylated enolate of a diketone, such as beta-acetoxypropenyl methyl ketone, which may be represented by the formula:

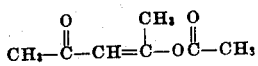

Previous attempts to prepare the homopolymer of the ester represented by the above formula have heretofore been universally unsuccessful (e. g. see C. D. Hurd, "Journal of the American Chemical Society," vol. 66 (1944), page 2013). It was therefore most unexpected to find that acylated enolates of diketones, which have been demonstrated to be incapable of polymerization, may be advantageously used to prepare valuable copolymers.

It has now been found that copolymers suitable as surface coating compositions, film-forming agents, and the like may be formed by copolymerizing an acylated enolate of a diketone and one or more polymerizable, unsaturated, organic compounds having one or a multiple of —CH=C< groups.

It is therefore an object of this invention to provide new copolymers of an acylated enolate of a diketone and unsaturated, polymerizable, organic compounds.

A further object is to provide a process for preparing new copolymers which are suitable as surface coating compositions, film-coating, and the like. Other objects will become apparent from a consideration of the following description.

The acylated enolates which I may use in my process may advantageously be prepared by reacting a ketene with a diketone in the presence of an acid esterification catalyst. Such a process is described in Spence et al. U. S. Patent 2,407,301, dated September 10, 1946. It is also possible to prepare these acylated enolates by reacting the desired diketone with an acid halide in the presence of a weak alkaline catalyst such as sodium acetate. (See Nef, "Annalen," volume 277 (1893), page 71.) Other methods will be obvious to those skilled in the art.

Acylated enolates which I may use to advantage in my process may be represented by the formula:

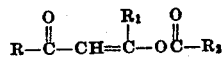

wherein R, R₁, and R₂ each represents a member selected from the group consisting of an alkyl group, such as methyl, ethyl, propyl, isopropyl (i. e. an alkyl group having the formula $C_nH_{2n+1}$ where $n$ is a positive integer from 1 to 3) and an aryl group, such as phenyl, o-, m- and p-tolyl, p-propyl phenyl, p-butyl phenyl, etc., i. e. a mononuclear aryl group of the benzene series having 6 to 10 carbon atoms. Typical are methyl-beta-acetoxypropenyl-1 ketone, methyl-beta - propionyloxypropenyl - 1 - ketone, methyl-beta-butyryloxypropenyl-1 ketone, methyl-beta-isobutyryloxypropenyl - 1 - ketone, methyl-beta-benzoxypropenyl-1-ketone, ethyl - beta-acetoxypropenyl-1-ketone, ethyl - beta-propionyloxypropenyl-1-ketone, ethyl-beta - butyryloxypropenyl-1-ketone, ethyl - beta - isobutyryloxypropenyl-1-ketone, ethyl-beta - benzoxypropenyl - 1 - ketone, propyl-beta-acetoxypropenyl - 1 - ketone, propyl-beta - isobutyryloxypropenyl - 1 - ketone, propyl-beta-benzoxypropenyl - 1 - ketone, methyl - beta-acetoxybutenyl - 1 - ketone, methyl-beta-isobutyryloxybutenyl-1-ketone, ethyl - beta-acetoxypentenyl - 1 - ketone, ethyl - beta - isobutyryloxypentenyl-1-ketone, methyl - beta-acetoxyhexenyl-1-ketone, propyl - beta-isobutyryloxyhexenyl-1-ketone, methyl-beta-isobutyryloxy-3-methylbuten-1-yl ketone, etc. Advantageously enol esters where R, R₁, or R₂ are methyl or ethyl groups may be used.

The unsaturated, polymerizable organic compounds which I may conveniently employ in my invention contain the group

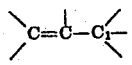

in which the carbon atom C₁ is doubly bound to another atom such as carbon, oxygen, or nitrogen, or triply bound to an atom such as carbon or nitrogen. Typical of the polymerizable unsaturated organic compounds which I may use are the acrylates, the methacrylates, fumarates, maleates, vinyl esters, alkyl alkenyl ketones, alpha- acyloxyalkenyl nitriles, alkenyl nitriles, and hydrocarbons containing conjugated, olefinic unsaturation.

The acrylates or methacrylates which I may use may be represented by the formula:

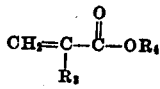

wherein $R_3$ represents a hydrogen atom or a methyl group, and $R_4$ represents an alkyl group such as methyl, ethyl, propyl, butyl, isobutyl, secondary and tertiary butyl (i. e., an alkyl group having the formula $C_nH_{2n+1}$ where $n$ is a positive integer from 1 to 4), an alkenyl group such as vinyl, allyl, methallyl, crotyl, (i. e., an alkenyl group having the formula $C_nH_{2n-1}$ where $n$ is a positive integer from 2 to 4), or an aralkyl group such as benzyl, beta-phenylethyl, beta-phenylbutyl (i. e., an aralkyl group of the benzene series having 7 to 10 carbon atoms). Typical of the acrylates and methacrylates are methyl acrylate, methyl methacrylate, ethyl acrylate, n-propyl methacrylate, n-butyl methacrylate, benzyl acrylate, allyl methacrylate, methallyl acrylate, etc.

The maleates or fumarates which I may advantageously use in my process may be represented by the formula:

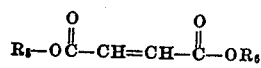

wherein $R_5$ and $R_6$ each represents a member selected from the group consisting of an alkyl group, such as methyl, ethyl, propyl, isopropyl, n-butyl, isobutyl, secondary and tertiary butyl (i. e. an alkyl group having the formula $C_nH_{2n+1}$ where $n$ is a positive integer from 1 to 4), an alkenyl group such as vinyl, allyl, methallyl, crotyl, (i. e. an alkenyl group having the formula $C_nH_{2n-1}$ where $n$ is a positive integer from 2 to 4), and an aralkyl group such as benzyl, beta-phenylethyl, beta-phenylpropyl, i. e. an aralkyl group of the benzene series having 7 to 10 carbon atoms. Typical are dimethyl maleate, dimethyl fumarate, diethyl maleate, diethyl fumarate, dipropyl maleate, dipropyl fumarate, diisopropyl maleate, diisopropyl fumarate, dibutyl maleate, dibutyl fumarate, divinyl maleate, divinyl fumarate, diallyl maleate, diallyl fumarate, dimethallyl maleate, dimethallyl fumarate, methyl allyl maleate, butyl methallyl maleate, butyl methallyl fumarate, isopropyl allyl fumarate, dibenzyl maleate, dibenzyl fumarate, butyl benzyl maleate, butyl benzyl fumarate, etc.

The unsaturated esters which I may advantageously use may be represented by the formula:

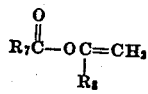

wherein $R_7$ represents a member selected from the group consisting of hydrogen, an alkyl group, such as methyl, ethyl, propyl, isopropyl, (i. e. an alkyl group having the formula $C_nH_{2n+1}$ where $n$ is a positive integer from 1 to 3), a

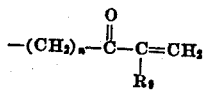

group where $n$ is a positive integer from 2 to 4, and $R_9$ represents hydrogen or methyl, an aryl group such as phenyl, o-, m-, and p-tolyl (i. e. a mononuclear aryl group having 6 to 10 carbon atoms), and a

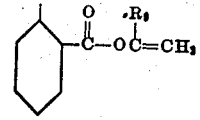

group where $R_9$ has the above designated definition, and $R_8$ represents a member selected from the group consisting of a hydrogen atom and a methyl ($CH_3$—) group. Typical are vinyl formate, vinyl acetate, vinyl propionate, vinyl butyrate, vinyl isobutyrate, divinyl succinate, divinyl adipate, divinyl phthalate, vinyl benzoate, isopropenyl acetate, isopropenyl butyrate, etc. Advantageously I may use esters where $R_2$ is an alkyl radical such as methyl, ethyl, etc. and $R_8$ is a hydrogen atom, i. e. vinyl acetate, vinyl propionate, etc.

The alkenyl ketones which I may use may be represented by the formula:

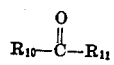

wherein $R_{10}$ represents a member selected from the group consisting of an alkyl group, such as methyl, ethyl, propyl, isopropyl, n-butyl, isobutyl, secondary and tertiary butyl (i. e. an alkyl group having the formula $C_nH_{2n+1}$ wherein $n$ is a positive integer from 1 to 4), and an alkenyl group such as vinyl, allyl, methallyl, isopropenyl, crotyl, etc. (i. e. an alkenyl group having the formula $C_nH_{2n-1}$ where $n$ is a positive integer from 2 to 4), and $R_{11}$ is an alkenyl group, such as vinyl, allyl, methallyl, isopropenyl, crotyl, etc. (i. e. an alkenyl group having the formula $C_nH_{2n-1}$ where $n$ is a positive integer from 2 to 4). Typical are methyl vinyl ketone, ethyl vinyl ketone, propyl vinyl ketone, butyl vinyl ketone, methyl isopropenyl ketone, ethyl isopropenyl ketone, propyl isopropenyl ketone, methyl allyl ketone, ethyl methallyl ketone, butyl crotyl ketone, diallyl ketone, divinyl ketone, dimethallyl ketone, vinyl isopropenyl ketone, etc. Advantageously I may use the alkyl alkenyl ketones where $R_{10}$ is an alkyl group, such as methyl or ethyl, and $R_{11}$ is an alkenyl group such as vinyl or isopropenyl.

The acyloxy alkenyl nitriles which I may advantageously use may be represented by the formula:

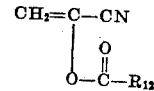

wherein $R_{12}$ represents an alkyl group, such as methyl, ethyl, propyl, isopropyl, butyl or isobutyl (i. e. an alkyl group having the formula $C_nH_{2n+1}$ where $n$ is a positive integer from 1 to 4). Typical are α-acetoxyacrylonitrile, α-propionyloxyacrylonitrile, α-isobutyryloxyacrylonitrile, etc.

The alkenyl nitriles which I may use may be represented by the formula:

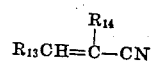

wherein $R_{13}$ represents a hydrogen atom or an alkyl group, such as methyl, ethyl, (i. e. an alkyl group having the formula $C_nH_{2n+1}$ where $n$ is a positive integer from 1 to 2) and $R_{14}$ is a hydrogen atom or methyl group. Typical are acrylonitrile, methacrylonitrile, 1-cyano-1-propene, and 1-cyano-1-butene.

The hydrocarbons which I may use contain the group —CH=C< or a multiple thereof. Typical are the aliphatic diolefins such as butadiene-1,3, isoprene, piperylene, 2,3-dimethyl-1,3-butadiene, 1,3-hexadiene, etc., the cycloaliphatic diolefins, such as cyclopentadiene, 1,3-cyclohexadiene, 2,2,1-bicycloheptadiene-1,3, etc., and aromatic olefins such as styrene, isopropenyl benzene, o-, m-, and p-methyl styrene, etc. Also vinyl acetylene, divinyl acetylene, etc., may be used.

In accordance with the process of my invention, I copolymerize a mixture comprising an acylated enolate of a diketone and at least one unsaturated, polymerizable, organic compound as defined by the above formulas. Ordinarily I only employ one of the above unsaturated, organic compounds, however I may use two or more such compounds in a single run to advantage. Generally I use 1-2 of the unsaturated compounds defined by the above formulae in the polymerization of an acylated enolate of a diketone.

The velocity of the copolymerization may be accelerated to a considerable extent by heating, or by the use of polymerization catalysts which are known to accelerate the polymerization of vinyl-type compounds. Exemplary of such catalysts are the organic peroxides (e. g. benzoyl peroxide, acetyl peroxide, acetyl benzoyl peroxide, lauroyl peroxide, oleoyl peroxide, etc.), hydrogen peroxide, perborates (e. g. alkali metal perborates), and persulfates (e. g. alkali metal persulfates).

The temperature at which the copolymerization is effected may vary from ordinary room temperature (approximately 20° C.) to approximately 60–65° C. The copolymerization can also be carried out by the bead or emulsion method in which water or some other medium in which the monomers are insoluble is employed as a dispersing medium, with or without emulsifying agents. The emulsion method of copolymerization is particularly suitable where a large ratio of the acylated enolate of the diketone to the polymerizable, unsaturated, organic compounds is desired. The copolymerization can also be effected in the presence of an inert diluent, such as benzene, toluene, etc., which is advantageously a solvent for the copolymer.

The ratio of acylated enolate of a diketone to polymerizable, unsaturated organic compound in the monomeric mixture prior to polymerization may be varied over a relatively wide range, depending on the specific nature of the reactants and the properties desired in the copolymer. If a comparatively large ratio of acylated enolate to unsaturated compound has been used, the resulting product may be only slightly viscous or may consist of the polymer dissolved in the excess of acylated enolate. To obtain the resinous copolymer it is merely necessary to add a solvent to the reaction mixture which dissolves the excess acylated enolate but not the copolymer, thus precipitating the copolymer. Such solvents as methanol, ethanol, etc., are useful for this purpose, although acetic acid, diethyl ether, etc. may also be used. Advantageously I can use from 1 to 10 parts by weight of acylated enolate to 10 to 1 parts by weight of another polymerizable, unsaturated, organic compound in preparing my new copolymers, however, a wider range can be used if desired. The copolymers thus prepared in accordance with the process of my invention can contain as high as 50 weight per cent of the acylated enolate of the diketone. Especially useful resins were prepared which contained from 5 to 25 weight per cent of the acylated enolate of a diketone.

The following examples will further serve to characterize my invention.

*Example I*

Seven (7) grams of methyl-beta-acetoxy propenyl ketone having the formula:

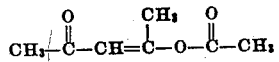

and five (5) grams of styrene were intimately mixed, and 1% (0.12 gm.) of acetyl benzoyl peroxide added. The resulting mixture was then heated at 50° C. for four days. A soft, clear colorless resin was thus obtained. The resin was then dissolved in acetone, and precipitated in methanol to give a white, fibrous solid. On analysis, the copolymer was found to contain 4.79% by weight of acetyl. When a molecularly equivalent amount of acrylonitrile replaces styrene in the above example, a colorless, viscous resin can be obtained.

*Example II*

Five (5) grams of methyl-beta-acetoxypropenyl ketone having the formula:

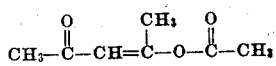

and ten (10) grams of methyl methacrylate were intimately mixed, and 1% (0.15 gm.) of acetyl benzoyl peroxide added. The mixture was then heated at 50° C. for 96 hours. The residue was cooled and a clear colorless polymer was obtained. The polymer was then dissolved in acetone and precipitated by the addition of methanol to give a white, fibrous substance. When a molecularly equivalent amount of ethyl acrylate replaces the methyl methacrylate in the above example, a resinous copolymer suitable for molding can be obtained.

*Example III*

Five (5) grams of methyl-beta-acetoxypropenyl ketone having the formula:

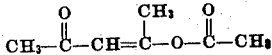

and five (5) grams of methyl isopropenyl ketone were intimately mixed, and 1% (0.1 gm.) of acetyl peroxide added. The mixture was then heated at 50° C. for 144 hours. The residue was cooled and a soft, clear resin was obtained. The polymer was then dissolved in acetone and precipitated by the addition of methanol to give a white, fibrous solid containing 2.50% by weight acetyl. When 7 grams of diisopropyl fumarate were used in place of the 5 grams of methyl isopropenyl ketone in the above example, a resinous solid suitable for molding was obtained. The properties of the resinous fumarate copolymer compared favorably with those of the copolymer of Example 2. Dibutyl maleate gave a copolymer likewise having properties similar to the copolymer of Example 2.

*Example IV*

Five (5) grams of methyl-beta-acetoxypropenyl ketone having the formula:

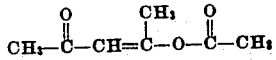

and five (5) grams of α-acetoxy acrylonitrile were intimately mixed, and 1% (0.1 gm.) of acetyl benzoyl peroxide added. The resulting mixture was then heated at 50° C. for 96 hours. The residue was cooled and a pale yellow resin was obtained. The copolymer was then dissolved in acetone and precipitated by the addition of methanol to give a white, powdery substance containing 8.1% nitrogen. When 5 grams of methyl-beta-benzoxypropenyl ketone replaced the methyl-beta-acetoxypropenyl ketone in the above example, a fibrous, colorless resin was obtained.

*Example V*

Ten (10) grams of methyl-beta-acetoxy propenyl ketone having the formula:

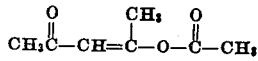

and five (5) grams of vinyl acetate were intimately mixed, and 0.5% (0.075 g.) of acetyl peroxide added. The mixture was heated at 70° C. for 72 hours. The resulting resin was cooled and a soft, clear polymer containing considerable monomer was obtained. The resin was dissolved in acetone, and precipitated with methanol to give a white, fibrous solid. On analysis, the copolymer was found to contain 59.3% by weight of acetyl. This corresponds to a copolymer containing one part of acylated enolate to three parts of vinyl acetate.

I claim:

1. A resinous copolymer containing in the polymer molecule from 5 to 50% by weight of an acetylated enolate represented by the formula:

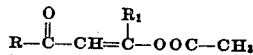

wherein R and $R_1$ each represents a member selected from the group consisting of a methyl group and an ethyl group, and from 50 to 95% by weight of another unsaturated copolymerizable compound selected from the group consisting of styrene; acrylonitrile; α-methacrylonitrile; esters represented by the formula:

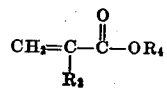

wherein $R_3$ represents a member selected from the group consisting of a hydrogen atom and a methyl group, and $R_4$ represents a member selected from the group consisting of an alkyl group of the formula $C_nH_{2n+1}$ wherein $n$ is a positive integer from 1 to 4, a benzyl group and a β-phenylethyl group; esters represented by the formula:

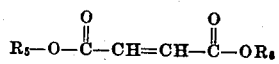

wherein $R_5$ and $R_6$ each represents an alkyl group of the formula $C_nH_{2n+1}$ where $n$ is a positive integer from 1 to 4; vinyl esters represented by the formula

wherein $R_7$ represents an alkyl group of the formula $C_nH_{2n+1}$ wherein $n$ is a positive integer from 1 to 3; alkenyl ketones represented by the formula:

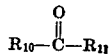

wherein R represents an alkyl group of the formula $C_nH_{2n+1}$ wherein $n$ is a positive integer from 1 to 4 and $R_{11}$ represents an alkenyl group of the formula $C_nH_{2n-1}$ wherein $n$ is a positive integer from 2 to 4; and α-acyloxyacrylonitriles represented by the formula:

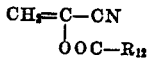

wherein $R_{12}$ represents an alkyl group of the formula $C_nH_{2n+1}$ wherein $n$ is a positive integer from 1 to 3.

2. A resinous copolymer containing in the polymer molecule from 5 to 25% by weight of an acetylated enolate represented by the formula:

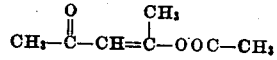

and from 75 to 95% by weight of an ester represented by the formula:

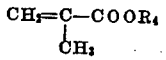

wherein $R_4$ represents an alkyl group of the formula $C_nH_{2n+1}$ wherein $n$ is a positive integer from 1 to 4.

3. A resinous copolymer containing in the polymer molecule from 5 to 25% by weight of an acetylated enolate represented by the formula:

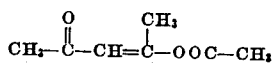

and from 75 to 95% by weight of methyl α-methacrylate.

4. A resinous copolymer containing in the polymer molecule from 5 to 25% by weight of an acetylated enolate represented by the formula:

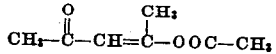

and from 75 to 95% by weight of an alkenyl ketone represented by the formula:

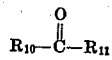

wherein $R_{10}$ represents an alkyl group of the formula $C_nH_{2n+1}$ wherein $n$ is a positive integer from 1 to 4 and $R_{11}$ represents an alkenyl group of the formula $C_nH_{2n-1}$ wherein $n$ is a positive integer from 2 to 4.

5. A resinous copolymer containing in the polymer molecule from 5 to 25% by weight of an acetylated enolate represented by the formula:

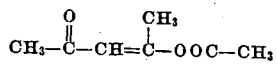

and from 75 to 95% by weight of an alkenyl ketone represented by the formula:

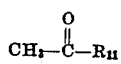

wherein $R_{11}$ represents an alkenyl group of the formula $C_nH_{2n-1}$ wherein $n$ is a positive integer from 2 to 4.

6. A resinous copolymer containing in the polymer molecule from 5 to 25% by weight of an acetylated enolate represented by the formula:

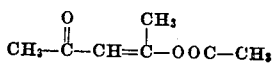

and from 75 to 95% by weight of methyl isopropenyl ketone.

7. A resinous copolymer containing in the polymer molecule from 5 to 25% by weight of an acetylated enolate represented by the formula:

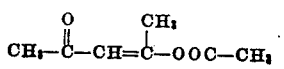

and from 75 to 95% by weight of a vinyl ester represented by the formula:

$$R_7\text{—COOCH=CH}_2$$

wherein $R_7$ represents an alkyl group of the formula $C_nH_{2n+1}$ wherein $n$ is a positive integer from 1 to 3.

8. A resinous copolymer containing in the polymer molecule from 5 to 25% by weight of an acetylated enolate represented by the formula:

and from 75 to 95% by weight of vinyl acetate.

9. A process for preparing resinous copolymers which comprises heating in the presence of a peroxide polymerization catalyst a mixture consisting of from 1 to 10 parts by weight of an acetylated enolate represented by the formula:

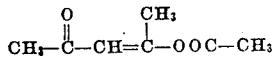

wherein R and $R_1$ each represents a member selected from the group consisting of a methyl group and an ethyl group, and from 1 to 10 parts by weight of another unsaturated compound selected from the group consisting of styrene; acrylonitrile; α-methacrylonitrile; esters represented by the formula:

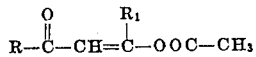

wherein $R_3$ represents a member selected from the group consisting of a hydrogen atom and a methyl group, and $R_4$ represents a member selected from the group consisting of an alkyl group of the formula $C_nH_{2n+1}$ wherein $n$ is a positive integer from 1 to 4, a benzyl group and a β-phenylethyl group; esters represented by the formula:

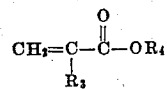

wherein $R_5$ and $R_6$ each represents an alkyl group of the formula $C_nH_{2n+1}$ where $n$ is a positive integer from 1 to 4; vinyl esters represented by the formula:

$$R_7\text{—COOCH=CH}_2$$

wherein $R_7$ represents an alkyl group of the formula $C_nH_{2n+1}$ wherein $n$ is a positive integer from 1 to 3; alkenyl ketones represented by the formula:

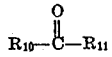

wherein R represents an alkyl group of the formula $C_nH_{2n+1}$ wherein $n$ is a positive integer from 1 to 4 and $R_{11}$ represents an alkenyl group of the formula $C_nH_{2n-1}$ wherein $n$ is a positive integer from 2 to 4; and α-acyloxyacrylonitriles represented by the formula:

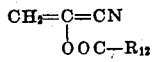

wherein $R_{12}$ represents an alkyl group of the formula $C_nH_{2n+1}$ wherein $n$ is a positive integer from 1 to 3.

10. A process for preparing resinous copolymers which comprises heating in the presence of a peroxide polymerization catalyst a mixture consisting of from 1 to 10 parts by weight of an acetylated enolate represented by the formula:

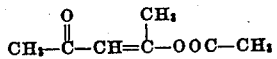

and from 1 to 10 parts by weight of an ester represented by the formula:

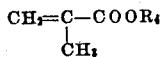

wherein $R_4$ represents an alkyl group of the formula $C_nH_{2n+1}$ wherein $n$ is a positive integer from 1 to 4.

11. A process for preparing resinous copolymers which comprises heating in the presence of a peroxide polymerization catalyst a mixture consisting of from 1 to 10 parts by weight of an acetylated enolate represented by the formula:

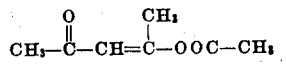

and from 1 to 10 parts by weight of methyl α-methacrylate.

12. A process for preparing resinous copolymers which comprises heating in the presence of a peroxide polymerization catalyst a mixture consisting of from 1 to 10 parts by weight of an acetylated enolate represented by the formula:

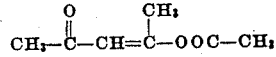

and from 1 to 10 parts by weight of an alkenyl ketone represented by the formula:

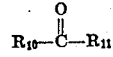

wherein $R_{10}$ represents an alkyl group of the formula $C_nH_{2n+1}$ wherein $n$ is a positive integer from 1 to 4 and $R_{11}$ represents an alkenyl group of the formula $C_nH_{2n-1}$ wherein $n$ is a positive integer from 2 to 4.

13. A process for preparing resinous copolymers which comprises heating in the presence of a peroxide polymerization catalyst a mixture consisting of from 1 to 10 parts by weight of an acetylated enolate represented by the formula:

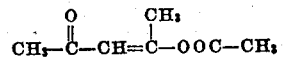

and from 1 to 10 parts by weight of an alkenyl ketone represented by the formula:

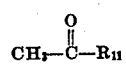

wherein $R_{11}$ represents an alkenyl group of the formula $C_nH_{2n-1}$ wherein $n$ is a positive integer from 2 to 4.

14. A process for preparing resinous copolymers which comprises heating in the presence of a peroxide polymerization catalyst a mixture consisting of from 1 to 10 parts by weight of an acetylated enolate represented by the formula:

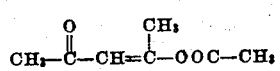

and from 1 to 10 parts by weight of methyl isopropenyl ketone.

15. A process for preparing resinous copolymers which comprises heating in the presence of a peroxide polymerization catalyst a mixture consisting of from 1 to 10 parts by weight of an acetylated enolate represented by the formula:

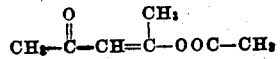

and from 1 to 10 parts by weight of a vinyl ester represented by the formula:

$$R_7\text{---COOCH=CH}_2$$

wherein $R_7$ represents an alkyl group of the formula $C_nH_{2n+1}$ wherein $n$ is a positive integer from 1 to 3.

16. A process for preparing resinous copolymers which comprises heating in the presence of a peroxide polymerization catalyst a mixture consisting of from 1 to 10 parts by weight of an acetylated enolate represented by the formula:

$$\text{CH}_3\text{---}\underset{\underset{\text{O}}{\|}}{\text{C}}\text{---CH=}\underset{\underset{\text{CH}_3}{|}}{\text{C}}\text{---OOC---CH}_3$$

and from 1 to 10 parts by weight of vinyl acetate.

HUGH J. HAGEMEYER, Jr.

No references cited.